Patented June 28, 1949

2,474,544

UNITED STATES PATENT OFFICE 2,474,544

FUSED CAST ALUMINA REFRACTORY

John Charles McMullen, Niagara Falls, N. Y., assignor to The Carborundum Company, Niagara Falls, N. Y., a corporation of Delaware No Drawing. Application August 10, 1946, Serial No. 689,825

11 Claims. (Cl. 106—63)

This invention relates to refractory articles of manufacture adapted for use as lining elements for glass tanks and other furnace constructions and similar applications where resistance to high temperature and/or corrosive elements is required. More particularly, it relates to fused cast refractory shapes made by fusing a mass of refractory material of the desired composition to the molten condition, casting the fused material while molten into suitable molds, and cooling the cast material under controlled conditions to form a monolithic article of desired size and shape. The invention is particularly concerned with predominantly alumina refractory compositions of improved physical characteristics in cast form.

The temperature and rate of operation of glass tanks and similar furnaces, for which the articles of the present invention are particularly well adapted, are usualy restricted by the limitations of the refractory linings therein used. There is a constant trend, as refractories are improved, to operate glass tanks and other furnaces at higher temperatures and higher capacities. In the case of glass tanks circulation and mixing of the molten glass must be maintained in the melting compartment in order to reduce any tendency of the melt to striate. However, the flow of the molten glass has so deleteriously affected the refractories heretofore used to form the walls of glass tanks by corrosion and erosion that the ability to use this beneficial stirring principle is distinctly limited by the refractories available. Moreover, the constant movement of molten glass past a given part of the glass tank or feeder (or the movement of the part through the glass) considerably shortens the life of the refractory element. Examples of refractory parts which are subjected to especially severe corrosive action by the flow of molten glass are refractory stirrers for chemical agitation, needles, feeder nozzles, and other feeder parts at the outlet as well as throat blocks used in glass tanks to divide the melting end from the working end, and other portions of the lining directly exposed to the action of the molten glass in motion. Such refractory parts are all directly contacted on one or more sides by hot glas in more or less constant motion and corrosion readily takes place, soon rendering the parts unfit for use.

Bonded refractories heretofore used have the additional disadvantage, when used in glass tanks, of failure through disintegration of the bonding ingredient which releases small particles of the more refractory constituent into the bath of molten glass. This action is highly undesirable since it produces "seeds" and "stones" and other defects which render the glass non-uniform and unsatisfactory for use. For that reason more recently, refractory articles for use in glass tank constructions have been of the fused cast type wherein the refractory article is of monolithic structure containing no extraneous bonding material. However, the cast refractories so far available for glass tank linings and other refractory applications have not been entirely satisfactory from the standpoint of one or more of such properties as resistance to the corrosive elements present in the glass tank or furnace structure, lack of resistance to thermal shock, contamination of the glass batch, and the like.

The manufacture of fused cast refractory bodies has also been limited by the numerous difficulties encountered in the fabrication of such articles. For example, some refractory compositions, such as ordinary beta alumina compositions, when fused to a molten condition, cast into molds and cooled form highly porous or coarsely crystalline structures which are highly subject to disintegration under corrosive or erosive conditions of use. On the other hand, ordinary alpha alumina cast compositions shrink considerably upon cooling from the molten state to leave the cast articles with large, undesirable central shrinkage cavities or vugs. Other compositions when fused and cast have such a pronounced tendency to crack or spall upon cooling that, regardless of all efforts to control the conditions of cooling the cast articles, they develop cracks or lines of weakness during their production. Again, other compositions, when fused and cast into molds, tend to either explode or grow in the mold and are therefore unfit for such types of manufacture.

I have found that cast refractories of the alumina type adapted for use as lining elements for glass tanks and other furnaces and other high temperature applications can be greatly improved by the modification thereof with small percentages of added constituents within narrow critical percentages. I have found that compositions containing, in addition to the alumina, small percentages of an alkali oxide, an alkaline earth oxide selected from the group consisting of calcium oxide, barium oxide and strontium oxide, and an acid oxide, in combination, when fused to the molten condition, cast into molds and suitably cooled, provide cast alumina refractory articles which are highly satisfactory for use as glass tank lining elements and other refractory applications.

I have discovered that when the amounts of the various constituents are selected in the amounts prescribed below, the resulting articles contain just sufficient alumina of the beta crystal form to counteract the shrinkage of the alumina present in the alpha crystal form so that the resultant articles are dense and finely crystalline, are without excessive shrinkage cavities or vugs or otherwise porous and, when cooled, are sound and free from cracks or lines of weakness. A typical mixture for forming cast refractories in accordance with the present invention consists of a high purity crystalline alumina, such as white alumina ore, together with 6% soda ash and 1½% soda-lime glass. By soda-lime glass I mean the commercial grade of soda-lime glass commonly used in the manufacture of bottles and window-glass, the composition range of which is given in the literature on glass technology, such as the text "Modern Glass Practice" by Samuel R. Scholes, published by Industrial Publications, Inc., Chicago, Illinois in 1935. The soda ash provides the major part of the necessary alkali oxide while the soda-lime glass provides the rest of the alkali oxide, the alkaline earth oxide and the acid oxide. The compositions of the cast refractory shapes made in accordance with the present invention contain by oxide analysis, in addition to the crystalline alumina which exists as a mixture of the alpha and beta crystal forms in approximately equal proportions, approximately 4–7% by weight of the modifying oxidic materials. The latter comprise small percentages of each of an alkali oxide such as sodium or potassium oxide, an alkaline earth oxide selected from the group consisting of calcium oxide, barium oxide and strontium oxide and an acid oxide, such as silica or titania, the alkali oxide amounting to approximately 5%, or 3% to 6½%, by weight of the mass, and constituting at least ⅔ of the combined percentage of modifying oxides, the acid oxide amounting to less than 2% and usually 1 to 2% by weight of the mass and the alkaline earth oxide amounting to from .1 to .4% by weight of the mass. When calcium oxide is the alkaline earth used, it usually amounts to .1% to .2% by weight of the mass. The alkaline earth oxide and acid oxide are usually added to the raw batch in the form of a soda-lime or similar type glass although they can be added as separate oxidic constituents if desired.

The presence of the particular modifying ingredients within the prescribed percentage ranges is highly critical to the provision of a satisfactory cast alumina article. For example, the omission of an alkaline earth oxide such as calcium oxide causes the resulting cast article to shrink excessively upon cooling so as to develop large central shrinkage cavities or vugs whereas the presence of an excess of the same alkaline earth oxide over and above the amount specified above causes the resulting refractory to crack or develop lines of weakness during the cooling of the article. Also, the omission of an acid oxide such as silica likewise causes the article to crack upon cooling. The omission of an alkaline oxide or its use in insufficient amounts, causes the resulting composition when poured into the mold to "grow" in the mold so as to form an unsatisfactory porous mass entirely unsuited for refractory usage. It has also been found that magnesium oxide cannot be used as the alkaline earth oxide since it is in many respects anomalous in behaviour to the true alkaline earth oxides such as calcium oxide, barium oxide, and strontium oxide. When magnesium oxide is incorporated in the composition from which such cast refractories are made it is found that the resulting refractories crack upon being cooled. Therefore, when alkaline earth oxides are referred to herein and in the claims it is intended to include only calcium oxide, barium oxide and strontium oxide, and to exclude such oxides as magnesium oxide and beryllium oxide which, while commonly considered as alkaline earth oxides, are in many respects anomalous in behavior to the oxides of calcium, barium and strontium.

Examples of compositions or raw batches that have been found satisfactory for the making of cast refractory articles of the type herein described are as follows:

*Example I*

| | Parts by weight |
|---|---|
| White alumina ore | 92.5 |
| Soda ash | 6 |
| Soda-lime glass | 1½ |

*Example II*

| | Parts by weight |
|---|---|
| White alumina ore | 92.5 |
| Soda ash | 6.34 |
| Flint | 1.18 |
| Whiting | .19 |

*Example III*

| | Parts by weight |
|---|---|
| White alumina ore | 92.5 |
| Soda ash | 6.34 |
| Flint | 1.18 |
| Barium carbonate | .37 |

In the production of refractories of the herein-described type highly pure alumina, usually in the form of white alumina ore or other source of high purity alumina, is fused in a furnace such as a submerged arc furnace (as, for instance, that disclosed in U. S. Patent No. 929,517 to F. J. Tone) similar to that used in the production of synthetic alumina abrasives. Alkali oxide, such as sodium or potassium oxide, usually in the form of soda ash, is either admixed with the original ore or is admixed in much larger proportions with a special charge of ore that is added to the furnace after fusion of the main bulk of the material has been completed. Also, the alkaline earth oxide and acid oxide are added to the raw batch, usually in the form of a soda-lime glass or its equivalent. The percentages of alkali oxide and acid oxide are somewhat lower in the final cast articles than the percentages of alkali oxide and acid oxide in the raw batch from which the articles are made since alkali oxides and acid oxides, such as sodium oxide and silica, volatilize to some extent at the temperature of the molten bath in the arc furnace.

In carrying out the fusion, the furnace generally consists of a water-cooled iron shell, having no other lining than that built up by the material being fused as it is fed into the furnace. Fusion is effected initially by the heat from a carbon train between two or more carbon or graphite electrodes inserted in the iron shell, but after a bath of molten material is formed the resistance of this molten material to the passage of electric current therethrough is used to supply heat. The material is gradually fed in, and the electrodes raised as the fused mass is built up. The procedure followed is substantially similar to that employed in making ordinary aluminous abrasives. When the material has arrived at the proper temperature and the correct degree of fluidity, it is poured into molds of the desired shape and size.

The molded pieces are left in the mold for heat treatment or, particularly in the case of iron molds, are taken from the molds shortly after the outer walls of the casting have solidified. Thereafter, they are carefully cooled by any of the methods well known in the art, and after they are cold, any objectionable remainder of the header or other minor roughness is removed by chipping or grinding.

Cast refractories of the type described herein possess numerous advantages over cast refractory shapes heretofore known. The combined presence of an alkali oxide, an alkaline earth oxide and an acid oxide in the alumina refractory produces an extremely fine crystalline structure which is unpenetrated by corrosive substances, and therefore is highly resistant to corrosive and erosive action. Furthermore, cast articles made of the herein-described compositions do not possess the large central shrinkage cavities or vugs so often found in other compositions in cast form. It has also been found that cast refractory compositions of the herein-described type, in spite of being finely crystalline and dense in structure throughout, when suitably annealed, are free from cracks or lines of weakness. The fact that the present refractories are formed mostly of high purity alumina and small amounts of other oxide ingredients which are normally found in glass and are not color-producing, together with the added fact that the present refractories are dense, finely crystalline and free of large central shrinkage cavities or otherwise highly porous, make the present refractories extremely valuable for use in glass furnaces, as for example, in the making of optical glass and other high-purity glass where contamination of the glass melt must be kept at an absolute minimum.

Refractories of the present compositions due to their freedom from central shrinkage cavities or otherwise porous structure, lack of cracks or lines of weakness, their dense, finely crystalline character and high alumina content, are exceptionally resistant to corrosion by the flow of molten glass so that it is possible to operate a glass tank or other furnace having lining elements or other parts composed of such refractories at temperatures much higher than those employed in furnaces using refractories of the usual type. The capability of operating such furnaces at increased temperatures increases the rate of production in the furnace due to the fact that increasing the temperature increases the rate of fusion of the constituents of the glass and sets up a relatively rapid and intensive circulation and thoroughly mixes very large batches. This is a very important commercial feature inasmuch as an increase in the capacity of a furnace results in a decrease in time and power consumed in the production per unit quantity of the melt, with resultant saving.

The present refractories are also advantageous where, in the operation of furnaces at the usual temperatures, it is found desirable to thoroughly insulate the outside of the tank so that there will be a minimum loss of heat through the wall. As such insulation insures against any drop in temperature at the outer edge of the melt, it promotes better furnace operating conditions, but heretofore the destructive effect of the molten glass on the refractory lining has militated against its adoption. Furthermore, the throats of the tanks may be operated with little or no air cooling in spite of the fact that the refractory used is in constant contact with hot glass on three sides. The insulation of the outside of the tank and elimination of cooling means permits considerable savings in direct loss of heat, as well as in space and accessory equipment.

Having described the invention in detail, it is desired to claim:

1. A fused cast alumina refractory article containing approximately 5% of an alkaline oxide and approximately 1½% of a commercial soda-lime glass, the remainder of said article being substantially entirely crystalline alumina, said article having a dense, finely crystalline structure.

2. A fused cast alumina refractory article containing approximately 5% sodium oxide and approximately 1½% of a commercial soda-lime glass, the remainder of said article being substantially entirely crystalline alumina, said article having a dense, finely crystalline structure.

3. A fused cast alumina refractory article containing, in addition to crystalline alumina, minor amounts of an alkali oxide, an alkaline earth oxide selected from the group consisting of calcium oxide, barium oxide and strontium oxide, and an acid oxide selected from the group consisting of silica and titania, the combined percentage of alkali oxide, alkaline earth oxide and acid oxide being 4% to 7% by weight of the mass with the acid oxide from an effective amount up to 2% by weight of the mass, and the alkaline earth oxide from 0.1% to .4% by weight of the mass, the remainder of said article being substantially entirely crystalline alumina, said article having a dense, finely crystalline structure.

4. A fused cast refractory article containing, by oxide analysis, 3% to 6½% by weight of an alkaline oxide, 1% to 2% by weight of an acid oxide selected from the group consisting of silica and titania, and .1% to .4% by weight of an alkaline earth oxide selected from the group consisting of calcium oxide, barium oxide and strontium oxide, the remainder of said article being substantially entirely crystalline alumina.

5. A fused cast refractory article containing, by oxide analysis, 3% to 6½% by weight of an alkaline oxide, 1% to 2% by weight of an acid oxide selected from the group consisting of silica and titania, and .1% to .4% by weight of an alkaline earth oxide selected from the group consisting of calcium oxide, barium oxide and strontium oxide, the remainder of said article being substantially entirely crystalline alumina, a substantial part of the alumina being of the beta crystal form.

6. A dense, sound, fused cast refractory shape containing, in addition to crystalline alumina, an alkali oxide, an alkaline earth oxide selected from the group consisting of calcium oxide, barium oxide and strontium oxide, and an acid oxide selected from the group consisting of silica and titania, the three minor oxide constituents being present in the combined percentage of 4% to 7% with the alkali oxide constituting over two-thirds of the 4% to 7% and the alkaline earth oxide constituting 0.1% to 0.4% by weight of the entire mass, the remainder of said article being substantially entirely crystalline alumina, said article having a dense, finely crystalline structure.

7. A fused cast refractory article containing, by oxide analysis, 3% to 6½% by weight of an alkaline oxide, 1% to 2% by weight of silica and approximately 0.1% by weight of calcium oxide, the remainder of said article being substantially entirely crystalline alumina, said article having a dense, finely crystalline structure.

8. A fused cast refractory article containing, by oxide analysis, 3% to 6½% by weight of an alkaline oxide, 1% to 2% by weight of silica and approximately 0.3% by weight of barium oxide, the remainder of said article being substantially entirely crystalline alumina, said article having a dense, finely crystalline structure.

9. A fused cast refractory article containing, by oxide analysis, 3% to 6½% by weight of an alkaline oxide, 1% to 2% by weight of silica, and .1% to .2% by weight of calcium oxide, the remainder of said article being substantially entirely crystalline alumina.

10. A fused cast refractory article comprising a mixture of alpha and beta forms of finely crystalline alumina in approximately equal amounts, said refractory article containing, in addition to the alumina, small but effective amounts of each of an alkali oxide, an alkaline earth oxide selected from the group consisting of calcium oxide, barium oxide and strontium oxide, and an acid oxide selected from the group consisting of silica and titania, the combined amounts of said alkaline oxide, alkaline earth oxide and acid oxide totaling 4-7% by weight of the mass, the remainder of said article being substantially entirely crystalline alumina, said article having a dense, finely crystalline structure.

11. A fused cast refractory article containing, by oxide analysis, 3% to 6½% by weight of an alkaline oxide, 1% to 2% by weight of silica, and .1% to .4% by weight of an alkaline earth oxide selected from the group consisting of calcium oxide, barium oxide and strontium oxide, the remainder of said article being substantially entirely crystalline alumina.

JOHN CHARLES McMULLEN.

REFERENCES CITED

The following references are of record in the file of this patent:

UNITED STATES PATENTS

| Number | Name | Date |
|---|---|---|
| 2,019,209 | Benner | Oct. 29, 1935 |
| 2,043,029 | Blau | June 2, 1936 |
| 2,075,694 | Benner | Mar. 30, 1937 |